(12) United States Patent
Iwasaki

(10) Patent No.: US 6,381,641 B1
(45) Date of Patent: Apr. 30, 2002

(54) NETWORK TRAFFIC MANAGEMENT SYSTEM

(75) Inventor: Jyunko Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,163

(22) Filed: Nov. 25, 1998

(30) Foreign Application Priority Data

Nov. 26, 1997 (JP) .............................................. 9-324375

(51) Int. Cl.⁷ ................................................ G06F 11/30
(52) U.S. Cl. ........................ 709/224; 709/223; 709/228; 370/360
(58) Field of Search ................................ 709/224, 223, 709/238; 370/351, 399, 360

(56) References Cited

U.S. PATENT DOCUMENTS

| | | | | |
|---|---|---|---|---|
| 5,335,225 A | * | 8/1994 | Brax ........................... | 370/282 |
| 5,563,874 A | | 10/1996 | Kant ........................... | 370/252 |
| 5,812,550 A | * | 9/1998 | Sohn et al. .................. | 370/395 |
| 5,886,643 A | * | 3/1999 | Diebboll et al. ............. | 709/224 |
| 5,898,837 A | * | 4/1999 | Guttman et al. ............. | 709/224 |
| 5,949,756 A | * | 9/1999 | Kienberger et al. ......... | 370/232 |
| 6,085,243 A | * | 7/2000 | Fletcher et al. ............. | 709/224 |
| 6,112,241 A | * | 8/2000 | Abdelnour et al. .......... | 709/224 |
| 6,208,627 B1 | * | 3/2001 | Menon et al. ............... | 370/328 |
| 6,279,037 B1 | * | 8/2001 | Tams et al. .................. | 709/224 |

FOREIGN PATENT DOCUMENTS

| | | |
|---|---|---|
| JP | 63-107249 | 5/1988 |
| JP | 4-180423 | 6/1992 |
| JP | 6-123959 | 5/1994 |
| JP | 7-162512 | 6/1995 |
| JP | 7-307762 | 11/1995 |
| JP | 8-32607 | 2/1996 |
| JP | 8-181711 | 7/1996 |
| JP | 8-265317 | 10/1996 |

OTHER PUBLICATIONS

Japanese Office Action, dated Jul. 18, 2000, with English language translation of Japanese Examiner's comments.

* cited by examiner

Primary Examiner—Kenneth R. Coulter
(74) Attorney, Agent, or Firm—McGuireWoods LLP

(57) ABSTRACT

A traffic management system includes a traffic monitor and a traffic manager. The traffic monitor monitors traffic at a reference point T of user network interface to produce traffic information for each connection established. The traffic-manager manages network traffic of the wide-area network based on the traffic information received from the traffic monitor. The traffic information is produced for each permanent virtual connection (PVC) or for each dedicated line.

43 Claims, 3 Drawing Sheets

FIG.3
FRAME-RELAY FRAME FORMAT
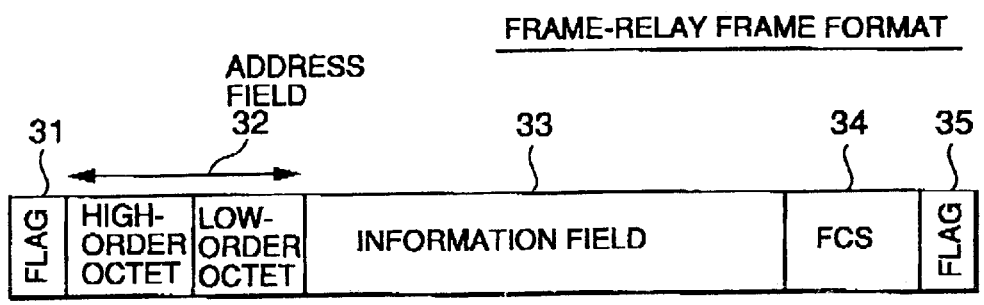
FIG.4
PPP FRAME FORMAT
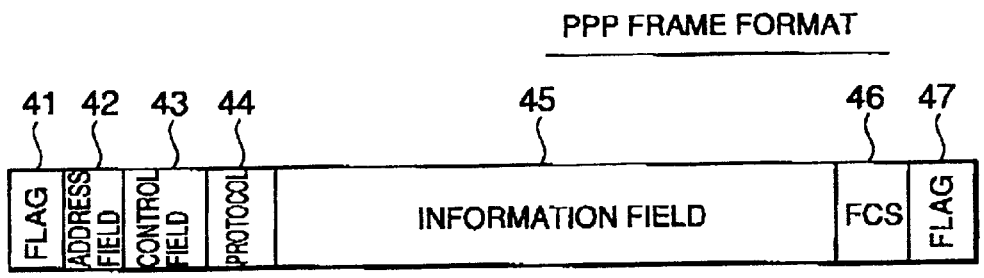
FIG.5
GROUP OF TRAFFIC INFORMATION FROM 01/01/98 0:10 AM TO 01/01/98 0:20 AM
| DLCI | TOTAL NUMBER OF OCTETS | TOTAL NUMBER OF FRAMES | TOTAL NUMBER OF ERROR OCTETS | TOTAL NUMBER OF ERROR FRAMES | ... |
|---|---|---|---|---|---|
| 16 | 640032 | 38000 | 312 | 20 | ... |
| 17 | 587067 | 20651 | 217 | 15 | ... |
| ⋮ | ⋮ | ⋮ | ⋮ | ⋮ | |

NETWORK TRAFFIC MANAGEMENT SYSTEM

BACKGROUND OF THE INVENTION

1. Field of the Invention

The present invention generally relates to a traffic management system of a wide-area network (WAN) and in particular to a traffic monitor and traffic management system and method for use in a frame-relay or leased-line (dedicated-line) network.

2. Description of the Related Art

In general, a WAN system is composed of a frame-relay/leased-line network and a plurality of subscriber systems. Each of the subscriber systems is provided with a router that handles a plurality of subscriber lines. The router is connected to the frame-relay/leased-line network through a digital service unit (DSU) and a terminal adapter (TA).

In such a network, traffic management is one of the most important management items and therefore various traffic management techniques have been proposed. For example, a routing control system disclosed in Japanese Patent Application Unexamined Publication No. 6-132959 performs centralized management regarding routers and LANs so as to reduce the network traffic.

A frame-relay exchange disclosed in Japanese Patent Application Unexamined Publication No. 7-307762 is provided with a table for storing a priority of a received frame for each data link connection identifier (DLCI). When the congestion exceeds a predetermined degree, a received frame having no priority is discarded so as not to discard a received from having high priority.

Further, there has been disclosed a method for displaying a traffic state within a network in Japanese Patent Application Unexamined Publication No. 8-181771. According to this method, a management station performs both configuration management and performance management to display easy-to-understand traffic states between network elements.

Although these conventional techniques can be combined to achieve a proper traffic management, such a conventional traffic monitoring system does not provide a means for monitoring the traffic of permanent virtual connection (PVC), resulting in reduced flexibility in add-on design of the subscriber system.

Further, the conventional traffic monitoring system is designed to monitor the traffic at a point between the TA and the router connected to the subscriber system. Therefore, in the case of the router having the TA built therein, an additional TA is needed to convert V-series interface to I-series interface.

SUMMARY OF THE INVENTION

An object of the present invention is to provide a traffic monitor and traffic management system and method that can improve flexibility in add-on design of a subscriber system.

Another object of the present invention is to provide a traffic monitor and traffic management system and method that can monitor the traffic for each connection within the wide-area network.

According to the present invention, traffic within a wide-area network such as a frame-relay/leased-line network is monitored at a reference point T of user network interface. In other words, a traffic management system includes a traffic monitor for monitoring traffic at a reference point T of user network interface to produce traffic information for each connection, and further includes a traffic manager for managing network traffic of the wide-area network based on the traffic information received from the traffic monitor. The traffic information may be produced for each permanent virtual connection (PVC) or for each dedicated line.

The traffic monitor may be provided with a connector that is connected to a subscriber line at the reference point T and branches a transmission signal of the subscriber line to produce a branched transmission signal. The traffic monitor may be further provided with an interface device for detecting a frame from the branched transmission signal during a designated time period and a processor for producing the traffic information of predetermined traffic parameters for each connection based on frames detected for the designated time period.

The traffic information may be produced by counting the frames for each permanent virtual connection (PVC) or for each dedicated line during the designated time period for each dedicated line. The traffic information may be produced for each data link connection identifier (DLCI) included in an address field of a frame.

BRIEF DESCRIPTION OF THE DRAWINGS

FIG. 3 is a diagram showing a signal format of a frame-relay frame;

FIG. 4 is a diagram showing a signal format of a PPP frame; and

FIG. 5 is a diagram showing an example of a group of traffic information stored in a traffic information memory.

DETAILED DESCRIPTION OF THE PREFERRED EMBODIMENT

Figure 1:
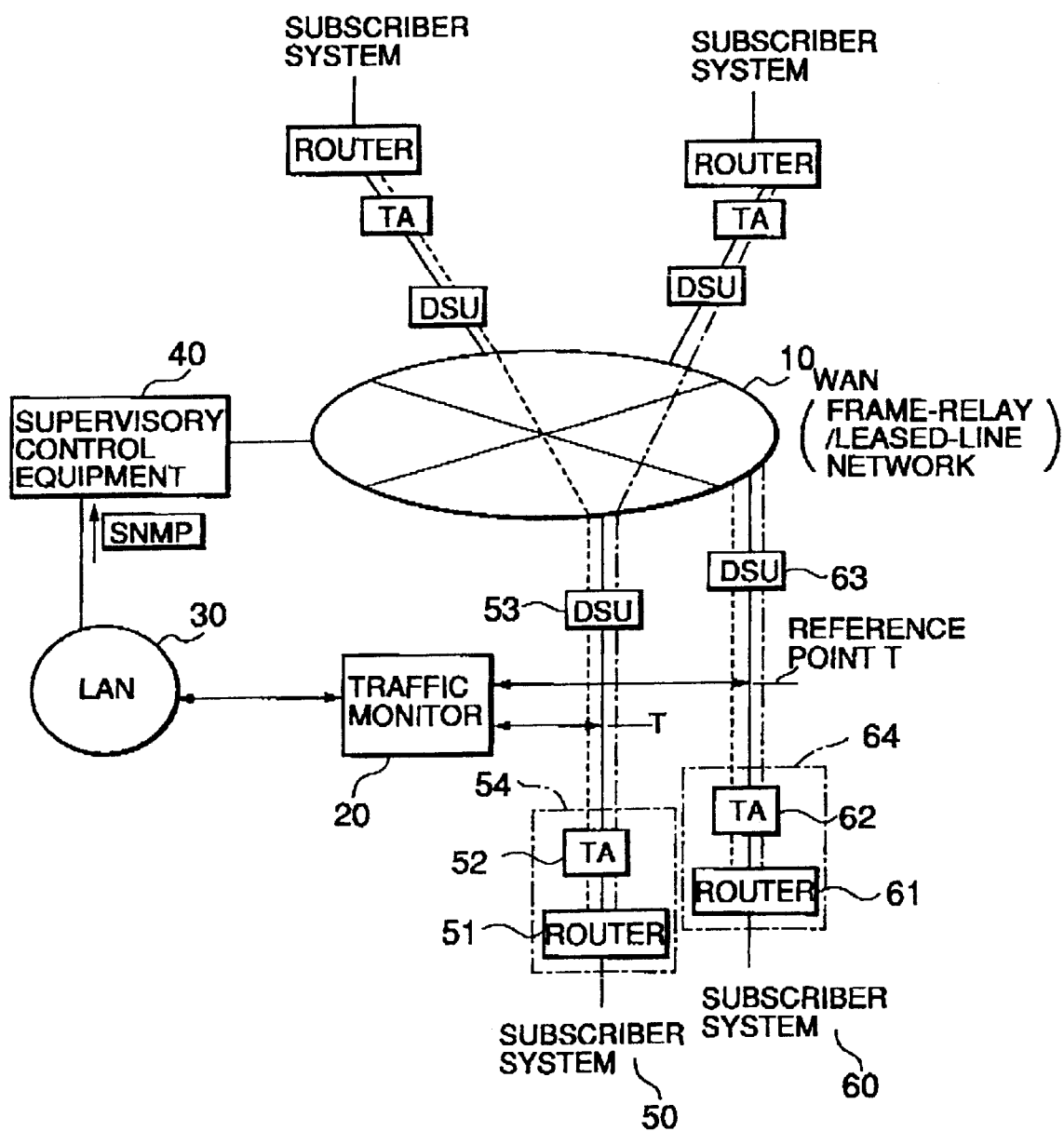
FIG. 1 is a block diagram showing a network configuration of a wide-area network employing a traffic management system according to an embodiment of the present invention.

Referring to FIG. 1, a WAN system is composed of a frame-relay/leased-line network 10 and a plurality of subscriber systems. Further, a traffic monitor 20 is connected to at least one subscriber line at reference point T and produces traffic information under the control of supervisory control equipment 40. As described later, the traffic information is summation data for predetermined items of the traffic characteristics. The traffic information obtained by the traffic monitor 20 is transferred to the supervisory control equipment 40 using simple network management protocol (SNMP) message through a local-area network (LAN) 30 that is provided as necessary. The supervisory control equipment 40 manages the traffic of the frame-relay/leased-line network 10 based on the traffic information received from the traffic monitor 20.

For simplicity, taking two subscriber systems 50 and 60 as an example, there will be described a traffic monitoring system according to the present invention.

The subscriber system 50 is connected to a router 51 that handles a plurality of subscriber lines therein and the router 51 is in turn connected to a terminal adapter (TA) 52. The TA 52 is connected to the frame-relay/leased-line network 10 through a digital service unit (DSU) 53 that is Network Termination 1 (NT1) providing a reference point T. A router 104 having the TA built therein may be used instead of the router 51 and the TA 52. Similarly, the subscriber system 60 is connected to a router 61 that handles a plurality of subscriber lines therein and the router 61 is in turn connected to a terminal adapter (TA) 62. The TA 62 is connected to the frame-relay/leased-line network 10 through a digital service unit (DSU) 63 that is Network Termination 1 (NT1) providing a reference point T. A router 64 having the TA built therein may be used instead of the router 61 and the TA 62.

The traffic monitor 20 is connected to each subscriber line at the reference point T through a branch cable or a tap connector and monitors the traffic of each connection through the frame-relay/leased-line network 10. In other words, the traffic monitor 20 operates as a so-called WAN probe.

Traffic Monitor

Figure 2:
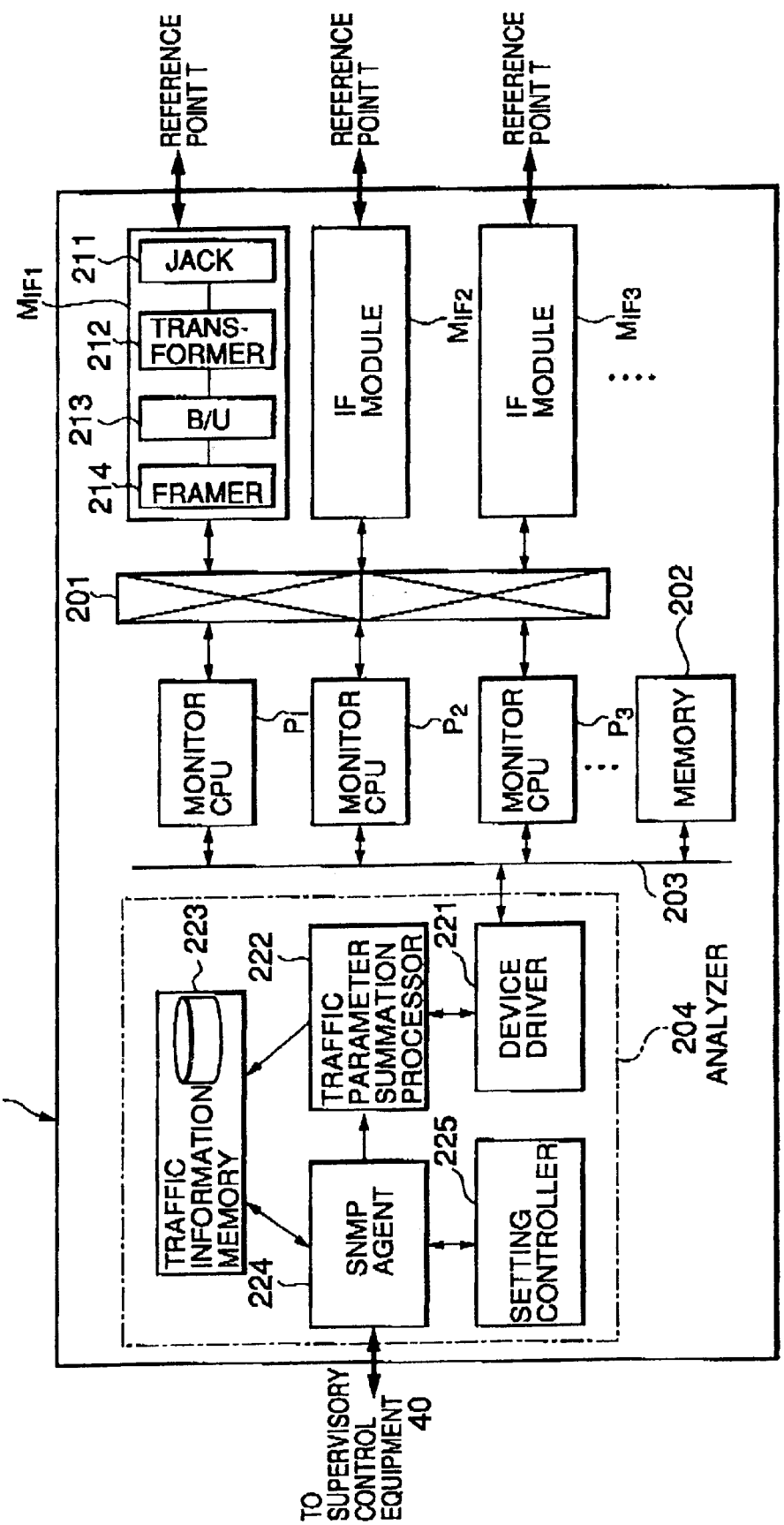
FIG. 2 is a block diagram showing a traffic monitor according to the embodiment.

Referring to FIG. 2, the traffic monitor 20 includes a plurality of interface (IF) modules $M_{IF1}$, $M_{IF2}$ ... $M_{IFN}$, which are each connected to the physical subscriber lines at the reference point T by the branch cable or the tap connector. The respective IF modules $M_{IF1}$–$M_{IFN}$ are connected to monitor processors $P_1$–$P_N$ through a selector 201. The monitor processors $P_1$–$P_N$ are connected to a memory 202 and an analyzer 204 through a PCI (peripheral component interconnect) bus 203.

Each of the IF modules $M_{IF1}$–$M_{IFN}$ detects data conformable to ITU-T recommendation I.431 and produces frames of data conformable to ITU-T recommendation Q.922. The IF module can handle a plurality of channels. For example, a single IF module can handle four 1.5M-bit channels or one 6M-bit channel.

The IF module is provided with at least one modular jack 211 which is designed to receive a plug of the branch cable connected at the reference point T of the DSU. In the case of four 1.5M-bit channels, four modular jacks are provided. The leads of the modular jack 211 are connected to the input terminals of a transformer 212 for impedance matching and the output terminals of the transformer 212 are connected to a bipolar-to-unipolar (B/U) converter 213. After the B/U converter 213 converts received data from bipolar to unipolar, a framer 214 detects a frame from the received data according to start and end flags to produce a Q.922 frame of data. As described later, each IF module is set to frame-relay/leased-line by downloading firmware for frame-relay/leased-line.

Further, the framer 214 checks FCS (frame check sequence) of the Q.922 frame and, if an error is detected, the framer 214 notifies the analyzer 204 of the number of error frames as error information. The normal frames are transferred to the selected monitor processor.

The respective monitor processors $P_1$–$P_N$ receive the normal frames from the IF modules $M_{IF1}$–$M_{IFN}$ through the selector 201 and stores them onto a memory 202 through the PCI bus 203. The respective monitor processors $P_1$–$P_N$ start collecting frames received from the channels depending on a monitoring start instruction received from the analyzer 204 and stop it when a monitoring stop instruction is received under the control of the supervisory control equipment 40. In other words, the respective monitor processors $P_1$–$P_N$ collect received frames during a time interval designated by the supervisory control equipment 40.

The monitor processors $P_1$–$P_N$ receive firmware for frame-relay/leased-line received from the supervisory control equipment 40 through the analyzer 204 and download the firmware to the IF modules $M_{IF1}$–$M_{IFN}$. When the firmware for frame-relay is downloaded to an IF module, this IF module can be used for frame-relay monitoring. When the firmware for leased-line is downloaded to an IF module, this IF module can be used for leased-line monitoring.

The analyzer 204 has the following functions: SNMP (simple network management protocol) message transmission and reception; MIB (management information base) operation; frame collection; summation for each of MIB groups; frame collection control; and software/firmware program download. The MIB groups include summation groups for each link and each PVC or data link channel identifier (DLCI).

The analyzer 204 produces traffic information based on the normal frames and the error information. The traffic information includes the items of traffic characteristics, for example, the respective total numbers of octets, frames, error octets and error frames for each link; the respective total numbers of octets, frames, error octets and error frames for each PVC or DLCI; and the respective total numbers of octets, frames, error octets and error frames for OSI (open systems interconnection) layers 3, 4 and upper layers such as TCP and UDP.

The analyzer 204 includes a device driver 221 connected to the PCI bus 203. The device driver 221 gets implementation information of the IF modules $M_{IF1}$–$M_{IFN}$ including channel name, channel rate, and type information (frame-relay or leased-line). The device driver 221 receives the Q.922 frames collected for a designated time interval from the memory 202 and combines each Q.922 frame with the corresponding channel name and information of the monitor processor from which that frame is input to produce frame data for each Q.922 frame.

A traffic parameter summation processor 222 performs summation for each of MIB groups based on the frame data received from the device driver 221 and stores the traffic information obtained by the summation operation onto a traffic information memory 223. In this embodiment, the traffic parameter summation processor 222 performs summation for each DLCI or leased line with respect to the above items.

An SNMP agent 224 uses a SNMP message to transmit the traffic information for a designated time interval to the supervisory control equipment 40 in response to a Get request. Further, the SNMP agent 224 transmits a trap indicating that something unusual has occurred to the supervisory control equipment 40. When receiving a Set request from the supervisory control equipment 40, a setting controller 225 performs the setting of the IF modules $M_{IF1}$–$M_{IFN}$ as described before.

Referring to FIG. 3, there is shown a format of frame-relay frame (Q.922 frame). The frame is composed of a start flag 31 followed by an address field 32 consisting of a high-order octet and a low-order octet. The address field 32 includes the DLCI. The address field 32 is followed by an information field 33, a FCS 34 and an end flag 35. Such a frame-relay frame can be received and detected by an IF module to which the firmware for frame-relay has been downloaded.

Referring to FIG. 4, there is shown a format of PPP (point to point protocol) frame received from a leased line. The frame is composed of a start flag 41 followed by an address field 42, a control field 43 and a protocol field 44. The protocol field 44 is followed by an information field 45, a FCS 46 and an end flag 47. Such a PPP frame can be received and detected by an IF module to which the firmware for leased-line has been downloaded.

Summation Operation

The traffic parameter summation processor 222 performs the summation operation for each group of MIB under the control of the supervisory control equipment 40. More specifically, when the supervisory control equipment 40 designates a channel to be checked and a time interval, the traffic parameter summation processor 222 performs the above-mentioned summation processing of frames collected for each DLCI of the designated channel at the designated time intervals.

When receiving the frame data from the device driver 221, the traffic parameter summation processor 222 extracts the DLCI value from the address field of each received Q.922 frame and counts the traffic parameters (normal frames, error frames, normal octets and error octets) which have been collected for each DLCI during the designated time interval. The respective total numbers of normal frames, error frames, normal octets and error octets are stored as a group of traffic information onto the traffic information memory 223. In this manner, a group of the traffic information for the designated time interval is sequentially stored in the traffic information memory 223. Assuming that the summation operation is performed at 10-minute intervals, an example will be described hereinafter.

Referring to FIG. 5, in the case where a designated channel is monitored from 0:10 am to 0:20 am on Jan. $1^{st}$ 1998, the traffic information memory 223 counts the above information parameters for each detected DLCI to produce a group of traffic information for that time interval, for example, 380000 normal frames for DLCI=16 and 20651 normal frames for DLCI=17.

The traffic information memory 223 transmits the traffic information to the supervisory control equipment 40 in response to the Get request from the supervisory control equipment 40 or by polling. The supervisory control equipment 40 edits and processes the traffic information received from the traffic a monitor 20 to display the traffic characteristics for each DLCI on screen. Based on the traffic characteristics for each DLCI in the frame-relay/leased-line network 10, the traffic control and additional line design can be easily made.

What is claimed is:

1. A traffic management system for a wide-area network, comprising:
    a traffic monitor for monitoring traffic at a reference point T of user network interface to produce traffic information for each connection; and
    a traffic manager for managing network traffic of the wide-area network based on the traffic information received from the traffic monitor, wherein the reference point T is located between a T-interface terminal of a digital service unit (DSU) and a terminal adapter that is connected to a subscriber system.

2. The traffic management system according to claim 1, wherein the traffic information is produced for each permanent virtual connection (PVC).

3. The traffic management system according to claim 1, wherein the traffic information is produced for each dedicated line.

4. The traffic management system according to claim 1, wherein the traffic monitor comprises:
    a plurality of connectors each connected to a subscriber line including at least one channel at the reference point T, for branching a transmission signal of the subscriber line to produce a branched transmission signal;
    an interface device for detecting a frame from the branched transmission signal for a designated channel of the subscriber line during a designated time period; and
    a processor for producing the traffic information of predetermined traffic parameters based on frames detected for the predetermined time period.

5. The traffic management system according to claim 4, wherein the traffic information is produced by counting the frames for each permanent virtual connection (PVC) during the designated time period.

6. The traffic management system according to claim 4, wherein the traffic information is produced by counting the frames for each dedicated line during the designated time period.

7. The traffic management system according to claim 5, wherein the traffic information is produced for each data link connection identifier (DLCI) included in an address field of a frame.

8. The traffic management system according to claim 4, wherein the traffic manager determines the designated channel of the subscriber line and the designated time period.

9. The traffic management system according to claim 8, wherein the traffic manager periodically determines the designated channel of the subscriber line and the designated time period.

10. The traffic management system according to claim 2, wherein the wide-area network is a frame-relay network.

11. The traffic management system according to claim 2, wherein the wide-area network is a dedicated-line network.

12. A traffic management system for a wide-area network, comprising:
    a traffic monitor for monitoring traffic at a reference point T of a user network interface to produce traffic information for a connection; and
    a traffic manager for managing network traffic of the wide-area network based on the traffic information received from the traffic monitor,
    wherein the traffic monitor comprises:
        a connector connected to a subscriber line at the reference point T, for branching a transmission signal of the subscriber line to produce a branched transmission signal;
        an interface device for detecting a frame from the branched transmission signal during a designated time period; and
        a processor for producing the traffic information of predetermined traffic parameters based on frames detected for the designated time period.

13. The traffic management system according to claim 12, wherein the traffic information is produced by counting the frames for each permanent virtual connection (PVC) during the designated time period.

14. The traffic management system according to claim 12, wherein the traffic information is produced by counting the frames for each dedicated line during the designated time period for each dedicated line.

15. The traffic management system according to claim 13, wherein the traffic information is produced for each data link connection identifier (DLCI) included in an address field of a frame.

16. The traffic management system according to claim 12, wherein the connector is connected between a T-interface terminal of a digital service unit (DSU) and a terminal adapter that is connected to a subscriber system.

17. The traffic management system according to claim 12, wherein the traffic manager controls the designated time period.

18. The traffic management system according to claim 21, wherein the traffic manager periodically controls the designated time period.

19. A traffic monitor for use in a wide-area network, comprising:
a connector connected to a subscriber line at a reference point T, for branching a transmission signal of the subscriber line to produce a branched transmission signal;
an interface device for detecting a frame from the branched transmission signal during a designated time period; and
a processor for producing traffic information of predetermined traffic parameters for each connection based on frames detected for the designated time period,
wherein the connector is connected between a T-interface terminal of a digital service unit (DSU) and a terminal adapter that is connected to a subscriber system.

20. The traffic management system according to claim 19, wherein the traffic information is produced by counting the frames for each permanent virtual connection (PVC) during the designated time period.

21. The traffic monitor according to claim 19, wherein the traffic information is produced by counting the frames for each dedicated line during the designated time period for each dedicated line.

22. The traffic monitor according to claim 19, wherein the reference point T is provided by a digital service unit (DSU).

23. The traffic monitor according to claim 19, wherein the connector is connected between a T-interface terminal of a digital service unit (DSU) and a terminal adapter that is connected to a subscriber system.

24. A traffic monitor for use in a wide-area network, comprising:
a connector connected to a subscriber line at a reference point T, for branching a transmission signal of the subscriber line to produce a branched transmission signal;
an interface device for detecting a frame from the branched transmission signal during a designated time period; and
a processor for producing traffic information of predetermined traffic parameters for each connection based on frames detected for the designated time period,
wherein the traffic information is produced for each data link connection identifier (DLCI) included in an address field of a frame.

25. A traffic monitor for use in a wide-area network, comprising:
a plurality of connectors each connected to a subscriber line including at least one channel at a reference point T, for branching a transmission signal of the subscriber line to produce a branched transmission signal;
an interface device for detecting a frame from the branched transmission signal for a designated channel of the subscriber line during a designated time period; and
a processor for producing traffic information of predetermined traffic parameters for each connection based on frames detected for the predetermined time period,
wherein each connector is connected between a T-interface terminal of a digital service unit (DSU) and a terminal adapter that is connected to a subscriber system.

26. The traffic monitor according to claim 25, wherein the traffic information is produced by counting the frames for each permanent virtual connection (PVC) during the designated time period.

27. The traffic monitor according to claim 25, wherein the traffic information is produced by counting the frames for each dedicated line during the designated time period.

28. The traffic monitor according to claim 25, wherein the designated channel of the subscriber line and the designated time period are determined depending on an instruction received from outside.

29. The traffic monitor according to claim 25, wherein the designated channel of the subscriber line and the designated time period are periodically determined depending on an instruction received from outside.

30. A traffic monitor for use in a wide-area network, comprising:
a plurality of connectors each connected to a subscriber line including at least one channel at a reference point T, for branching a transmission signal of the subscriber line to produce a branched transmission signal;
an interface device for detecting a frame from the branched transmission signal for a designated channel of the subscriber line during a designated time period; and
a processor for producing traffic information of predetermined traffic parameters for each connection based on frames detected for the predetermined time period,
wherein the traffic information is produced for each data link connection identifier (DLCI) included in an address field of a frame.

31. A traffic management method for a wide-area network, comprising the steps of:
a) monitoring traffic at a reference point T of a user network interface to produce traffic information for each connection; and
b) managing network traffic of the wide-area network based on the traffic information,
wherein the reference point T is located between a T-interface terminal of a digital service unit (DSU) and a terminal adapter that is connected to a subscriber system.

32. The traffic management method according to claim 31, wherein the traffic information is produced for each permanent virtual connection (PVC).

33. The traffic management method according to claim 31, wherein the traffic information is produced for each dedicated line.

34. A traffic management method for a wide-area network, comprising the steps of:
a) monitoring traffic at a reference point T of a user network interface to produce traffic information for each connection, wherein the step a) comprises branching a transmission signal at the reference point T of a subscriber line to produce a branched transmission signal; detecting a frame from the branched transmission signal during a designated time period; and producing the traffic information of predetermined parameters based on frames detected for the designated time period; and
b) managing network traffic of the wide-area network based on the traffic information.

35. The traffic management method according to claim 34, wherein the traffic information is produced by counting the frames for each permanent virtual connection (PVC) during the designated time period.

36. The traffic management method according to claim 34, wherein the traffic information is produced by counting the frames for each dedicated line during thee designated time period for each dedicated line.

37. The traffic management method according to claim 34, wherein the traffic information is produced for each data link connection identifier (DLCI) included in an address field of a frame.

38. A traffic management method for a wide-area network, comprising the steps of:
   a) monitoring traffic at a reference point T of a user network interface to produce traffic information for a connection, wherein the step a) comprises branching a transmission signal of a subscriber line including at least one channel to produce a branched transmission signal; detecting a frame from the branched transmission signal for a designated channel of the subscriber line during a designated time period; and producing the traffic information of predetermined traffic parameters based on frames detected for the designated time period; and
   b) managing network traffic of the wide-area network based on the traffic information.

39. The traffic management method according to claim 38, wherein the traffic information is produced by counting the frames for each permanent virtual connection (PVC) during the designated time period.

40. The traffic management method according to claim 38, wherein the traffic information is produced by counting the frames for each dedicated line during the designated time period.

41. The traffic management method according to claim 39, wherein the traffic information is produced for each data link connection identifier (DLCI) included in an address field of a frame.

42. The traffic management method according to claim 38, wherein the designated channel of the subscriber line and the designated time period are determined depending on an instruction received from outside.

43. The traffic management system according to claim 38, wherein the designated channel of the subscriber line and the designated time period are periodically determined depending on an instruction received from outside.

* * * * *